May 21, 1946. E. C. SCHESSER 2,400,656
INFINITELY ROTATABLY ADJUSTABLE CONNECTION
Filed June 12, 1944
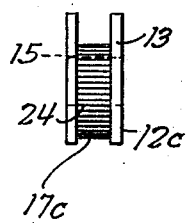
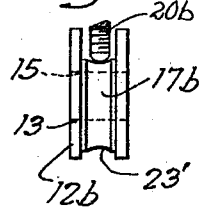
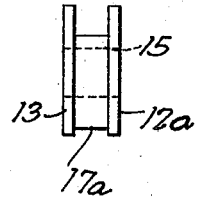
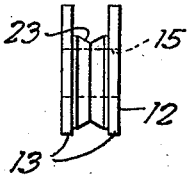
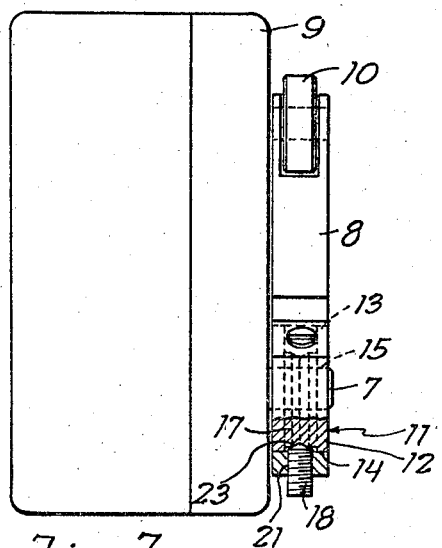
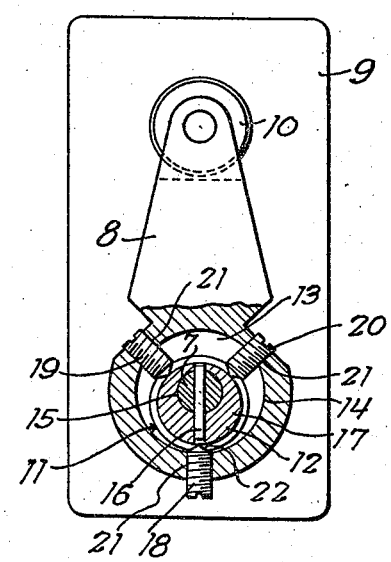
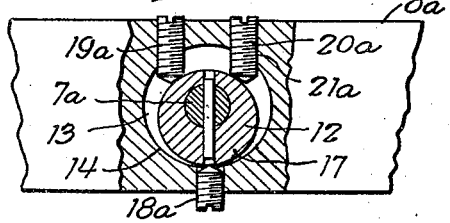
Inventor
Ermen C. Schesser Patented May 21, 1946

2,400,656

UNITED STATES PATENT OFFICE 2,400,656

INFINITELY ROTATABLY ADJUSTABLE CONNECTION

Ermen C. Schesser, Rockford, Ill.

Application June 12, 1944, Serial No. 539,977

20 Claims. (Cl. 287—52.08)

This invention relates to a new and improved infinitely rotatably adjustable connection adapted for many uses in machinery, devices, and apparatus of all kinds, the application to a limit switch herein shown, to permit infinite adjustment of the switch operating arm, being merely one example selected at random, inasmuch as the invention contemplates broadly means for adjustably fixing any type of machine elements on shafts, or the like.

The principal object of my invention is to provide a bearing cartridge adapted to be pinned, or otherwise secured, to a shaft with relation to which an arm or lever is to be made infinitely adjustable, the cartridge having spaced concentric bearing portions having a close working fit in a bearing hole in the arm or lever, and having an intermediate eccentric portion for abutment with set screws threaded inwardly in the bearing portion of the arm or lever to lock said arm or lever firmly in any desired position of adjustment throughout three hundred sixty degrees.

The eccentric portion of the bearing cartridge may, in accordance with my invention, be cylindrical and have a smooth or serrated periphery for contact with the ends of the set screws, or the periphery may be provided with an annular V-groove to cooperate with conical ended screws, or have an annular groove formed to cooperate with spherically ended set screws.

The invention is illustrated in the accompanying drawing, in which—

Figs. 1 and 2 are two views of a limit switch, the operating arm of which has an infinitely rotatably adjustable connection made in accordance with my invention, as indicated in the sectioned portions;

Fig. 3 is an isolated view of the bearing cartridge used in Figs. 1 and 2;

Figs. 4, 5, and 6 are similar views of bearing cartridges of modified or alternative construction, and Fig. 7 is a view somewhat similar to Fig. 2, but showing the adjustable fastening of a double end lever to a shaft using a different Y-arrangement of set screws.

Similar reference numerals are applied to corresponding parts throughout the views.

Referring first to Figs. 1, 2, and 3, the shaft 7 is arranged to be oscillated by means of the arm 8 to make or break an electrical circuit through whatever switch mechanism is contained in the housing 9. For example, in the case of a machine tool application, where a movable carriage has dogs adjustably fixed thereon to operate limit switches to make and break circuits at predetermined points in the travel of the carriage, a dog on the carriage is arranged to strike the roller 10 that is mounted on the free end of the arm 8, whereby to throw the switch to an open or closed position, as the case may be. Now, the particular angle at which the arm 8 is set in relation to the shaft 7 may determine the instant of make or break of the circuit and, in some instances, may be simply a matter of adapting the particular style of switch to the special needs of a certain machine, bearing in mind the fact that there may be space available for mounting a switch calling for the extension of the arm 8 from the switch at any given angle within 360°, whereas a switch of standard design and construction with perhaps only two or four possible settings for the operating arm could not be used. The infinitely adjustable connection of my invention, indicated generally by the reference numeral 11, makes it a simple matter to set the arm 8 at precisely the desired angle throughout 360°, and, if a trial setting does not prove to be entirely satisfactory, fine adjustments may be made easily one way or the other in order to obtain the exact setting desired.

The connection comprises a bearing cartridge 12 having spaced concentric cylindrical bearing portions 13 having a close working fit in a hole 14 provided therefor in the fixed end of the arm 8 concentric with the shaft 7, there being a center hole 15 through the cartridge for snug reception of the shaft 7, and the cartridge being suitably secured to the shaft 7 against rotation with respect thereto, as by means of a pin 16 entered through registering holes in the shaft 7 and intermediate portion 17 of the cartridge. The intermediate portion 17 is generally of cylindrical form but eccentric with respect to the bearing portions 13 and shaft hole 15. Set screws 18, 19, and 20, are threaded in radial holes 21 provided therefor in the fixed end of the arm 8 and are preferably arranged in a Y-formation, as clearly appears in Fig. 2, the screws 19 and 20 being approximately 90° apart and the screw 18 approximately midway between the screws 19 and 20, namely, 135° from each of said screws. These screws have conical ends 22, which are arranged to engage in the annular V-groove 23 provided therefor in the middle eccentric portion 17 of the cartridge.

In operation, it should be clear that when all of the screws 18, 19, and 20 are tightened against the eccentric 17, the arm 8 is fixed rigidly in whatever position has been selected, and any position throughout 360° may be selected. The eccentricity of the portion 17 positively precludes likelihood of slippage, because if the arm 8 seeks to turn in either direction with respect to the cartridge 12, one of the three set screws will prevent such a shift in relationship, by reason of the necessity for one of these screws to "climb" to a "higher" position on the eccentric. Manifestly, if a trial setting of the arm 8 has been made and is not found to be quite satisfactory, it is a simple matter to loosen the screws a turn or so and then turn the arm 8 through whatever slight angularity is considered necessary and then re-tighten the screws. In that way the arm 8 can be set at any desired angle exactly, and any adjustment can be made down to any fraction of a degree, the adjustability being infinite.

While I have shown the invention as applied to a limit switch, it should be clear that if the shaft 7 were a shaft in any automatic machine, for example, and there were two arms to oscillate with the shaft, the one being non-adjustably fixed thereto and the other adjustably fixed, as, for example, like the arm 8, one could readily adjust the two arms with respect to one another by adjustment of the adjustable arm in the manner described above for the arm 8, and thus permit setting the two arms in any desired relation angularly with respect to one another. Such adjustment is frequently necessary in an automatic machine, in order to obtain the proper spacing or timing in the movement of one part with respect to another. Furthermore, while I have described the invention as applied to a limit switch, it is obvious that the same adjustment is desirable frequently in hydraulic control circuits, where the devices to be operated are valves instead of switches. These two other examples are cited merely to indicate the wide field of use for the infinitely adjustable connection herein disclosed, and, of course, a host of other examples could be pointed out.

In Fig. 7 a double end lever 8a is shown fastened adjustably to the shaft 7a, using a cartridge 12 and three set screws 18a, 19a, and 20 threaded in holes 21a that are parallel to one another, the hole for the screw 18a being preferably, though not necessarily, on a line midway between the holes for the screws 19a and 20a. With this Y-arrangement the same results are obtained as with the Y-arrangement of Fig. 2, in so far as adjustability of the lever is concerned, and it is a simpler matter to drill and tap the holes for the screws.

In lieu of the annularly V-grooved eccentric 17, the bearing cartridge may be of the form shown at 12a in Fig. 4, in which the eccentric 17a is of cylindrical form and has a smooth periphery. This cartridge is otherwise of the same form as the cartridge 12 of Figs. 1 to 3. If the conical ended screws tend to roughen the eccentric 17a, this objection may be overcome by hardening the whole cartridge, these cartridges 12 and 12a being preferably of steel.

On the other hand, a cartridge like that shown at 12b in Fig. 5 may be provided, in which the eccentric portion 17b has an annular groove 23' of rounded form, to match spherical ends provided on the set screws instead of the conical ends 22, as indicated at 20b in Fig. 5.

The cartridge shown at 12c in Fig. 6 is a further variation, in which the eccentric portion 17c is of cylindrical form but has transverse serrations, as indicated at 24, for non-slipping engagement with the conical ends 22 of the screws 18—20.

It is believed the foregoing description conveys a good understanding of the objects and advantages of my invention. The appended claims have been drawn to cover all legitimate modifications and adaptations.

I claim:

1. In combination, a shaft, a member to be secured thereto having a bearing hole provided therein, a securing element fixed to the shaft and adapted to have said member adjustably secured thereto to vary the angularity of said member relative to the shaft, said element comprising a cylindrical bearing portion concentric to the shaft and rotatably received in said bearing hole, and another substantially cylindrical portion eccentric to the bearing portion, and clamping screws threaded on said member in circumferentially spaced relation to and engageable at their inner end with said eccentric portion.

2. In combination, a shaft, a member to be secured thereto having a bearing hole provided therein, a securing element fixed to the shaft and adapted to have said member adjustably secured thereto to vary the angularity of said member relative to the shaft, said element comprising a pair of coaxially spaced cylindrical bearing portions concentric with the shaft and rotatably received in said bearing hole, and another substantially cylindrical portion between but eccentric to the bearing portions, and clamping screws threaded on said member in circumferentially spaced relation to and engageable at their inner end with said eccentric portion.

3. The combination set forth in claim 1, wherein there are at least three clamping screws on said member in Y-relationship, substantially as and for the purpose described.

4. The combination set forth in claim 2, wherein there are at least three clamping screws on said member in Y-relationship, substantially as and for the purpose described.

5. The combination set forth in claim 1, wherein said securing element has an annular groove provided in the eccentric portion to receive the ends of the screws.

6. The combination set forth in claim 1, wherein said securing element has an annular groove provided in the eccentric portion to receive the ends of the screws, said groove being V-shaped and the ends of said screws being substantially conically pointed and adapted to fit substantially in the V-groove.

7. The combination set forth in claim 1, wherein said screws have spherically-shaped inner ends and said securing element has an annular groove provide in the eccentric portion to receive the ends of the screws, said groove being of rounded form in cross-section adapted substantially to fit the spherically-shaped ends of said screws.

8. The combination set forth in claim 1, wherein said securing element has the periphery of its eccentric portion suitably roughened to reduce likelihood of slippage relative thereto of the ends of the screws.

9. The combination set forth in claim 2, wherein said securing element has an annular groove provided in the eccentric portion to receive the ends of the screws.

10. The combination set forth in claim 2, wherein said securing element has an annular groove provided in the eccentric portion to receive the ends of the screws, said groove being V-shaped and the ends of said screws being substantially conically pointed and adapted to fit substantially in the V-groove.

11. The combination set forth in claim 2, wherein said screws have spherically-shaped inner ends and said securing element has an annular groove provided in the eccentric portion to receive the ends of the screws, said groove being of rounded form in cross-section adapted substantially to fit the spherically-shaped ends of said screws.

12. The combination set forth in claim 2, wherein said securing element has the periphery of its eccentric portion suitably roughened to reduce likelihood of slippage relative thereto of the ends of the screws.

13. As an article of manufacture, a bearing cartridge for adjustably fixing machine elements on shafts, comprising a body of generally cylindrical form having a center hole provided therein to receive a shaft and formed to provide axially spaced concentric end portions of cylindrical form having smooth surfaces provided on the periphery thereof for rotatable bearing engagement in a bearing opening in a member adapted to receive said cartridge, and an eccentric substantially cylindrical portion between said end portions.

14. As an article of manufacture, a bearing cartridge for adjustably fixing machine elements on shafts, comprising a body of generally cylindrical form having a center hole provided therein to receive a shaft and formed to provide axially spaced concentric end portions of cylindrical form having smooth surfaces provided on the periphery thereof for rotatable bearing engagement in a bearing opening in a member adapted to receive said cartridge, and an eccentric substantially cylindrical portion between said end portions, said eccentric portion having an annular groove provided therein.

15. As an article of manufacture, a bearing cartridge for adjustably fixing machine elements on shafts, comprising a body of generally cylindrical form having a center hole provided therein to receive a shaft and formed to provide axially spaced concentric end portions of cylindrical form having smooth surfaces provided on the periphery thereof for rotatable bearing engagement in a bearing opening in a member adapted to receive said cartridge, and an eccentric substantially cylindrical portion between said end portions, said eccentric portion having an annular groove provided therein which is of rounded cross-section.

16. As an article of manufacture, a bearing cartridge for adjustably fixing machine elements on shafts, comprising a body of generally cylindrical form having a center hole provided therein to receive a shaft and formed to provide axially spaced concentric end portions of cylindrical form having smooth surfaces provided on the periphery thereof for rotatable bearing engagement in a bearing opening in a member adapted to receive said cartridge, and an eccentric substantially cylindrical portion between said end portions, said eccentric portion being suitably roughened on the periphery thereof.

17. In combination, a shaft, a member to be secured thereto, a securing element fixed to the shaft and adapted to have said member adjustably secured thereto to vary the angularity of said member relative to the shaft, said element comprising a substantially cylindrical screw abutment in eccentric relation to the shaft and to the member which is rotatably adjustable with respect to the shaft, and clamping screws threaded on said member in circumferentially spaced relation to and engageable at their inner end with said eccentric abutment.

18. The combination set forth in claim 17, wherein there are at least three clamping screws on said member in Y-relationship, substantially as and for the purpose described.

19. The combination set forth in claim 17, wherein said eccentric abutment has an annular groove provided therein adapted to receive the ends of the screws.

20. In combination, a shaft, a member to be secured thereto having a bearing hole provided therein, a securing element fixed to the shaft and adapted to have said member adjustably secured thereto to vary the angularity of said member relative to the shaft, said element comprising a cylindrical bearing portion concentric to the shaft and rotatably received in said bearing hole, and an abutment on said securing element in eccentric relation to said bearing portion adapted to be engaged by set screws, and set screws threaded on said member in circumferentially spaced relation to said bearing portion and abutment and arranged to engage at their inner ends on said abutment.

ERMEN C. SCHESSER.